United States Patent [19]
Letsinger

[11] 3,990,658
[45] Nov. 9, 1976

[54] BOUNDARY LAYER CONTROL FOR AIR CUSHION LANDING SYSTEMS

[75] Inventor: Gary R. Letsinger, Seattle, Wash.

[73] Assignee: The Boeing Company, Seattle, Wash.

[22] Filed: Oct. 24, 1974

[21] Appl. No.: 517,453

[52] U.S. Cl. .......................... 244/100 A; 244/23 R; 180/128
[51] Int. Cl.² ........................................... B60V 3/08
[58] Field of Search ....... 244/42 CC, 100 R, 100 A, 244/130, 23 R, 105, 102 R; 114/67 A; 180/128, 124, 127

[56] References Cited
UNITED STATES PATENTS

| | | | |
|---|---|---|---|
| 3,184,185 | 5/1965 | Brocard | 244/42 CC |
| 3,205,847 | 9/1965 | Smith | 114/67 A |
| 3,363,718 | 1/1968 | Hammett | 180/128 |
| 3,410,241 | 11/1968 | Hardy et al. | 114/67 A |
| 3,414,077 | 12/1968 | Earl | 180/128 |
| 3,455,266 | 2/1969 | Giles | 114/67 A |
| 3,478,836 | 11/1969 | Eckered et al. | 180/128 |

Primary Examiner—Trygve M. Blix
Assistant Examiner—Galen L. Barefoot
Attorney, Agent, or Firm—Brown, Murray, Flick & Peckham

[57] ABSTRACT

An air cushion landing system for aircraft, ground effect machines and the like utilizing boundary layer control around the outer sides of an inflated bag to improve its aerodynamic characteristics. This is achieved by air jets along the outside walls of the bag, the jets being normal or essentially tangential to the outside wall surface of the bag depending upon the aerodynamic effect desired. Preferably, the air jets are produced by simply permitting air, used to inflate the air cushion landing bag, to escape through orifices in the side walls of the bag.

6 Claims, 5 Drawing Figures

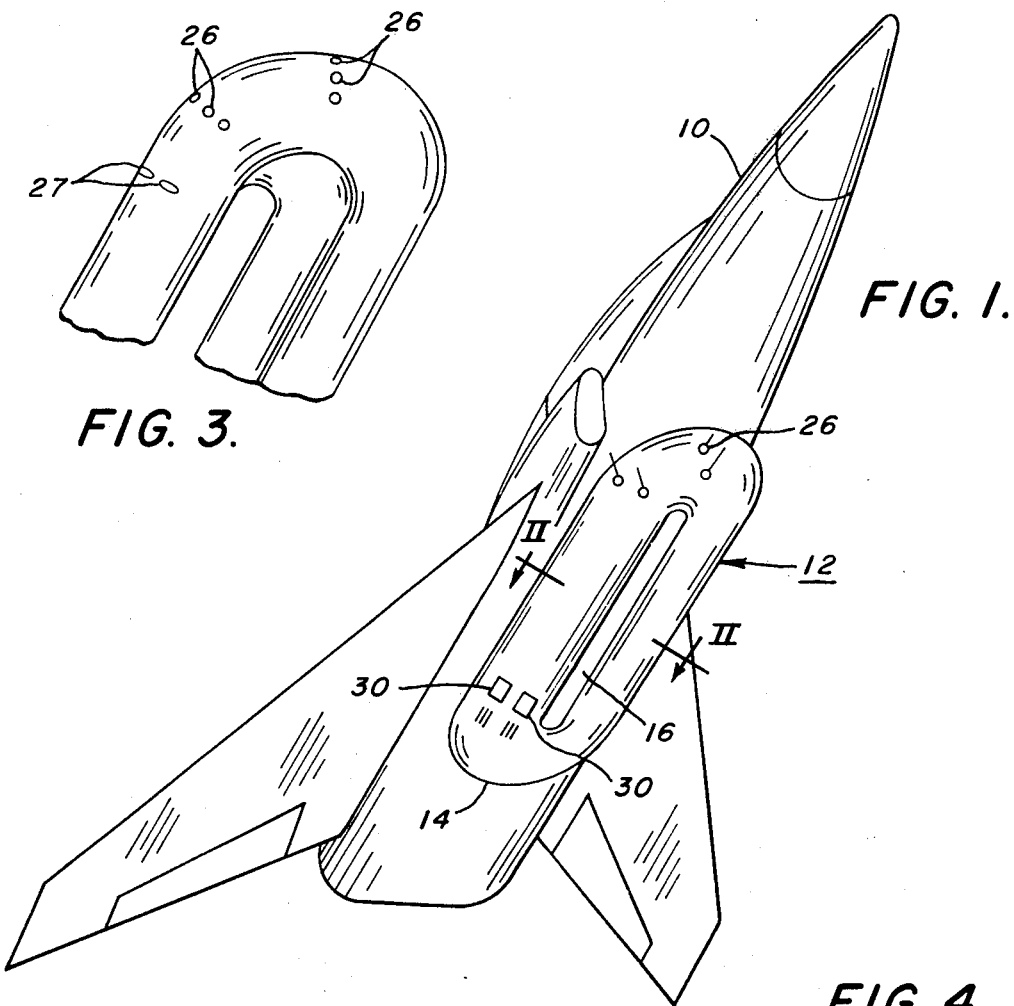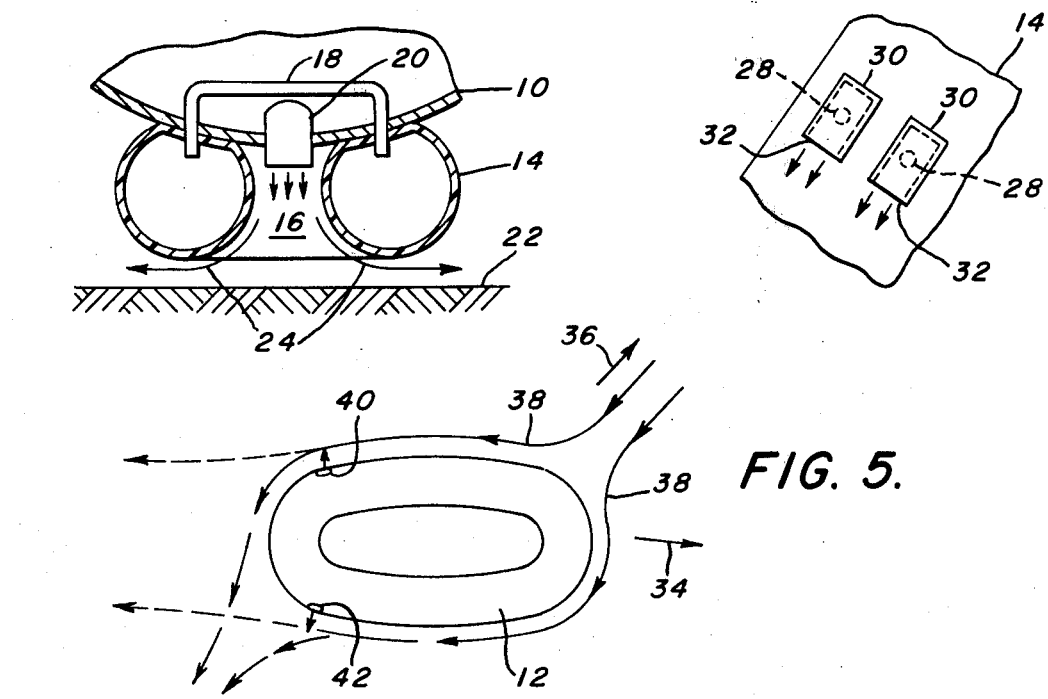

BOUNDARY LAYER CONTROL FOR AIR CUSHION LANDING SYSTEMS

BACKGROUND OF THE INVENTION

As is known, an air cushion landing system for aircraft consists of an inflated bag of continuous tubular configuration on the bottom of an aircraft. In many cases, it resembles an inverted rubber life raft. In one type of landing system, air is pumped into the middle of the surrounding tubular configuration and is allowed to escape out the bottom. In other embodiments, the air used to inflate the tubular configuration is permitted to escape through orifices in the bottom of the configuration. In either case, as the system nears the ground, the escape of air is retarded such that pressure builds up between the ground and the inflated tubular configuration. This pressure, acting over the area of the inflated bag and the cavity defined within the tubular configuration, will support the weight of the aircraft during landing, takeoff and taxiing.

One problem encountered with inflated landing bag systems of this type is that they are large and have poor aerodynamic characteristics. In particular, they usually cause a reduction in the directional stability of the aircraft. Previous attempts to solve this problem have merely been to make the tail surfaces on the aircraft larger in order to counteract the effects of the air cushion landing bag system. This, however, increases the weight of the aircraft, aircraft drag and also increases the overall cost of the aircraft.

SUMMARY OF THE INVENTION

The present invention provides a means for improving the aerodynamic characteristics of an inflated bag used in an air cushion landing system for aircraft and the like. This is achieved with the use of jet streams normal or tangent to the outer side walls of the inflated bag of the landing system to either produce flow separation at a selected area using the jets normal to the surface or causing separated flow to reattach by use of the jets blowing tangential to the surface, depending on the design of the bag and the aerodynamic conditions encountered.

Specifically, there is provided in accordance with the invention, an improvement in air cushion landing systems comprising means for generating air jets along the outside walls of an inflated air cushion landing bag for effecting boundary layer control around the bag to improve its aerodynamic characteristics while the aircraft is moving. The air jets can be either normal or tangential to the outer surfaces of the bag, depending upon the effect desired. Preferably, these jets are provided by simply providing openings in the bag itself to permit air within the bag, used to inflate it, to escape to the atmosphere. In the case where a jet is desired which is normal to the side wall of the bag, air is simply permitted to escape through an opening or orifice in the bag. On the other hand, when a tangential jet is desired, a rectangular patch, for example, is placed over an orifice in the bag and secured to the bag along three edges only, whereby air will escape from the orifice and through the remaining open edge of the patch to produce a tangential jet effect.

The above and other objects and features of the invention will become apparent from the following detailed description taken in connection with the accompanying drawings which form a part of this specification, and in which:

FIG. 1 is a diagrammatic view of an aircraft provided with an air cushion landing system and incorporating the boundary layer control of the present invention;

FIG. 2 is a schematic cross-sectional view of the inflated air cushion landing bag of FIG. 1 taken substantially along line II—II of FIG. 1;

FIG. 3 is a perspective view showing orifices which may be provided in the inflated landing bag of the invention to provide air jets which are normal to the side walls of the inflated bag;

FIG. 4 illustrates another type of arrangement for producing air jets which are essentially tangential to the side walls of the inflated landing bag; and FIG. 5 is a diagrammatic representation of an aerodynamic condition which can be encountered with a landing bag and one possible way in which the air jets provided by the invention can effect corrective action.

With reference now to the drawings, and particularly to FIGS. 1 and 2, an aircraft 10 is shown having an inflated landing bag 12 secured to its underside. The landing bag 12 resembles an inflated life raft in configuration and comprises an essentially continuous tube 14 having a space 16 defining an area surrounded by the tube. As shown in FIG. 2, the tube 14 can be inflated by means of air under pressure supplied from the aircraft through suitable conduits 18, the conduits 18 being shown diagrammatically in FIG. 2. When the aircraft is airborne, the tube 14 will normally be deflated so as to reduce drag. However, as the aircraft approaches the ground, the tube 14 will be inflated; and, at the same time, air from a conduit 20 will be caused to flow into the space 16 such that as the aircraft approaches the ground surface 22, a back-pressure is created with the air escaping underneath the tube 14 as indicated by the arrows 24. This back-pressure will support the aircraft on the ground surface. In certain air cushion landing systems, holes are provided in the bottom of the tube 14 to create the necessary back-pressure, the air of inflation escaping through these holes.

As was explained above, an air cushion landing system of the type shown in FIGS. 1 and 2, and particularly the tube 14 on the underside of the aircraft, is relatively large and can degrade the aerodynamic characteristics of the aircraft. This is especially true, for example, with regard to the directional stability of the aircraft. The directional stability of the aircraft is materially reduced.

In accordance with the present invention, there is provided means for effecting boundary layer control around the outer surface of the bag 12 whereby the airflow can be caused to either remain attached or spoiled so that it is separated from the surface of the bag. Since the bag is inflated, there is a source of air under pressure available within it.

Two types of aerodynamic spoilers are shown in FIGS. 3 and 4. In FIG. 3, they simply comprise orifices 26 and slots 27 in the skin of the tube 14 along its outer side walls. These allow air to squirt out normal to the surface, causing the airflow to separate from the surface. Orifices 26, being round, produce pencil-like jets; while the slots 27 produce sheets of air under pressure. For a given rate of airflow, a "sheet" produced by an elongated slot or opening will have more surface area and will mix better with the external airflow.

In FIG. 4, an arrangement is shown which causes the airflow to remain attached to the tube, where it would otherwise separate, by adding energy to the boundary layer. This is done by causing a sheet of air to eject essentially tangent to the side wall of the bag in the direction of the airflow. The system of FIG. 4 comprises orifices or openings 28 in the side of the tube 14, these being covered by patches 30 which are sewn or otherwise secured to the tube 14 along three edges only. This leaves an open edge 32 through which a sheet of air can eject. This causes the airflow to remain attached to the sides of the bag where it would otherwise separate.

A hypothetical situation in which the bag 12 can be used is illustrated in FIG. 5. The direction of the aircraft relative to the air mass it is flying in is along the direction of arrow 36. The aircraft is pointed in the direction of arrow 34. The angle between arrows 34 and 36 is the sideslip angle and it is caused by an inadvertent control input, lack of proper control coordination or an atmospheric disturbance. Directional stability is the property of an aircraft that causes the sideslip angle to return to zero of its own accord. This is accomplished by designing the aircraft so that the yawing moment caused by a sideslip will always oppose the sideslip and yaw the airplane into the relative freestream. This action is the same as that of a weather vane. The aerodynamic forces on an air cushion bag, due to a sideslip, set up a yawing moment that is unstable. The yawing moment yaws the aircraft in the direction that makes the sideslip angle larger. It is the purpose of the blowing jets 26, 27, 32, etc., to change the airflow in a manner that will reduce the unstable yawing moment, or any other undesired property. In a sideslip condition, the air will flow along the direction of the arrows 38. This will produce a torque on the aircraft causing it to yaw the wrong way. However, if it is assumed that orifices are provided in the side walls of the bag as at 40 and 42, the air stream will be caused to separate from the surface of the bag changing the airflow. By experimenting, the airflow can be changed in a manner that will reduce the torque tending to cause the aircraft to yaw. It will be appreciated, of course, that depending upon requirements, various configurations of the openings and/or arrangements shown in FIGS. 3 and 4 can be provided in the air cushion landing bag to effect different aerodynamic effects, depending upon requirements.

Although the invention has been shown in connection with certain specific embodiments, it will be readily apparent to those skilled in the art that various changes in form and arrangement of parts may be made to suit requirements without departing from the spirit and scope of the invention. In this respect, it will be apparent that instead of providing orifices in the bag itself, it is also possible to provide the desired jet streams by way of tubes extending along the inside or outside surface of the air bag, in which case the inflation pressure of the bag itself would not be used to produce the jets but rather a source of air connected to the aforesaid tubes.

I claim as my invention:

1. In an air cushion landing system for wing-supported aircraft wherein a bag formed of flexible material is inflated to support the aircraft on the ground and is provided with means for producing pressure between the inflated bag and a ground surface to create an air cushion effect; the improvement in said landing system comprising means for generating air jets along the outside side walls of the inflated bag for effecting boundary layer control around the bag to improve its aerodynamic effects while the aircraft is in flight above the ground, said air jets extending in a direction other than downwardly toward the ground.

2. The improvement of claim 1 wherein the means for generating air jets comprises orifices in the outside side walls of the inflated bag to produce jets of air which project from the outside side walls of the inflated bag.

3. The improvement of claim 1 wherein the means for generating air jets along the outside side walls of the inflated bag comprise orifices in the bag, and a cover for each orifice, the cover being secured to the bag along portions of its periphery only to produce an air jet extending substantially tangential to the outside side surface of the inflated bag.

4. The improvement of claim 1 wherein the means for generating air jets along the outside side walls of the inflated bag comprise circular orifices.

5. The improvement of claim 1 wherein the means for generating air jets along the outside side walls of the inflated bag comprise elongated slots in the bag.

6. A method for landing a wing-supported aircraft comprising positioning a bag of inflated flexible material beneath the aircraft, selectively producing pressure between the inflated bag and a ground surface to create an air cushion effect, and generating air jets along the outside side walls of the inflated bag for effecting boundary layer control around the bag to improve its aerodynamic effects while the aircraft is in flight above the ground, the air jets extending in a direction other than downwardly toward the ground.

* * * * *